United States Patent
Wynn et al.

(10) Patent No.: US 7,337,368 B2
(45) Date of Patent: Feb. 26, 2008

(54) SYSTEM AND METHOD FOR SHUTDOWN MEMORY TESTING

(75) Inventors: Allen C. Wynn, Round Rock, TX (US); Austin P. Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 516 days.

(21) Appl. No.: 10/862,289

(22) Filed: Jun. 7, 2004

(65) Prior Publication Data

US 2005/0273587 A1 Dec. 8, 2005

(51) Int. Cl.
*G06F 11/00* (2006.01)
(52) U.S. Cl. ..................................... 714/42
(58) Field of Classification Search ............... 714/36, 714/25, 30, 42, 46, 703, 718, 733, 742
See application file for complete search history.

(56) References Cited

U.S. PATENT DOCUMENTS

| | | | | |
|---|---|---|---|---|
| 4,809,276 A * | 2/1989 | Lemay et al. | ............... | 714/704 |
| 4,953,131 A * | 8/1990 | Purdham et al. | ............. | 365/222 |
| 5,325,365 A * | 6/1994 | Moore et al. | .................. | 714/29 |
| 5,367,670 A * | 11/1994 | Ward et al. | ................... | 714/47 |
| 5,500,940 A * | 3/1996 | Skeie | ........................... | 714/25 |
| 5,519,869 A * | 5/1996 | Payne et al. | .................... | 713/2 |
| 5,621,883 A | 4/1997 | Thoulon et al. | ....... | 395/182.07 |
| 5,659,748 A | 8/1997 | Kennedy | .................... | 395/652 |
| 5,675,795 A | 10/1997 | Rawson et al. | ............. | 395/652 |
| 5,761,411 A * | 6/1998 | Teague et al. | ................ | 714/47 |
| 5,828,583 A * | 10/1998 | Bush et al. | .................. | 702/185 |
| 5,860,001 A | 1/1999 | Cromer et al. | .............. | 395/651 |
| 6,000,040 A * | 12/1999 | Culley et al. | ................. | 714/31 |
| 6,009,541 A * | 12/1999 | Liu et al. | ....................... | 714/36 |
| 6,035,420 A | 3/2000 | Liu et al. | ....................... | 714/25 |
| 6,134,668 A * | 10/2000 | Sheikh et al. | ............... | 713/310 |
| 6,158,000 A * | 12/2000 | Collins | ........................... | 713/1 |
| 6,216,226 B1 | 4/2001 | Agha et al. | .................... | 713/2 |
| 6,249,885 B1 * | 6/2001 | Johnson et al. | ............... | 714/47 |
| 6,347,372 B1 | 2/2002 | Takashima et al. | ............ | 713/2 |
| 6,385,721 B1 | 5/2002 | Puckette | ........................ | 713/2 |
| 6,434,696 B1 * | 8/2002 | Kang | ............................. | 713/2 |
| 6,449,735 B1 | 9/2002 | Edwards et al. | .............. | 714/25 |
| 6,467,054 B1 * | 10/2002 | Lenny | .......................... | 714/42 |
| 6,553,519 B1 * | 4/2003 | Walker et al. | ............... | 714/715 |
| 6,598,182 B1 * | 7/2003 | Lowitz et al. | ................ | 714/39 |
| 6,636,985 B1 * | 10/2003 | Ono et al. | ...................... | 714/8 |
| 6,697,920 B2 * | 2/2004 | Nijhawan et al. | ........... | 711/153 |
| 6,877,118 B2 | 4/2005 | Oshima et al. | ............. | 714/719 |
| 7,000,159 B2 * | 2/2006 | Stern et al. | .................. | 714/718 |
| 2001/0042225 A1 * | 11/2001 | Cepulis et al. | ................ | 714/25 |
| 2002/0083369 A1 * | 6/2002 | Schelling | ...................... | 714/36 |

(Continued)

FOREIGN PATENT DOCUMENTS

WO WO 98/00781 1/1998

*Primary Examiner*—Robert W. Beausoliel
*Assistant Examiner*—Elmira Mehrmanesh
(74) *Attorney, Agent, or Firm*—Baker Botts L.L.P.

(57) ABSTRACT

In accordance with the teachings of the present disclosure, a system and method for reducing the amount of time for a boot operation is provided that substantially reduces disadvantages and problems associated with previously developed memory testing systems and methods. The system includes using a shutdown memory test module to perform the bulk of memory testing during system shutdown, rather than at system start up.

19 Claims, 3 Drawing Sheets

U.S. PATENT DOCUMENTS

| | | |
|---|---|---|
| 2003/0140208 A1 | 7/2003 | LaBerge et al. ............ 711/170 |
| 2003/0149828 A1 | 8/2003 | Nijhawan et al. .............. 711/2 |
| 2003/0200290 A1* | 10/2003 | Zimmerman et al. ....... 709/222 |
| 2003/0208675 A1* | 11/2003 | Burokas et al. ................ 713/1 |
| 2004/0199824 A1* | 10/2004 | Harter ......................... 714/30 |
| 2005/0210328 A1* | 9/2005 | Allue et al. .................... 714/25 |
| 2006/0150016 A1* | 7/2006 | Miller et al. ................... 714/25 |
| 2007/0112899 A1* | 5/2007 | Edwards et al. ............ 707/205 |

* cited by examiner

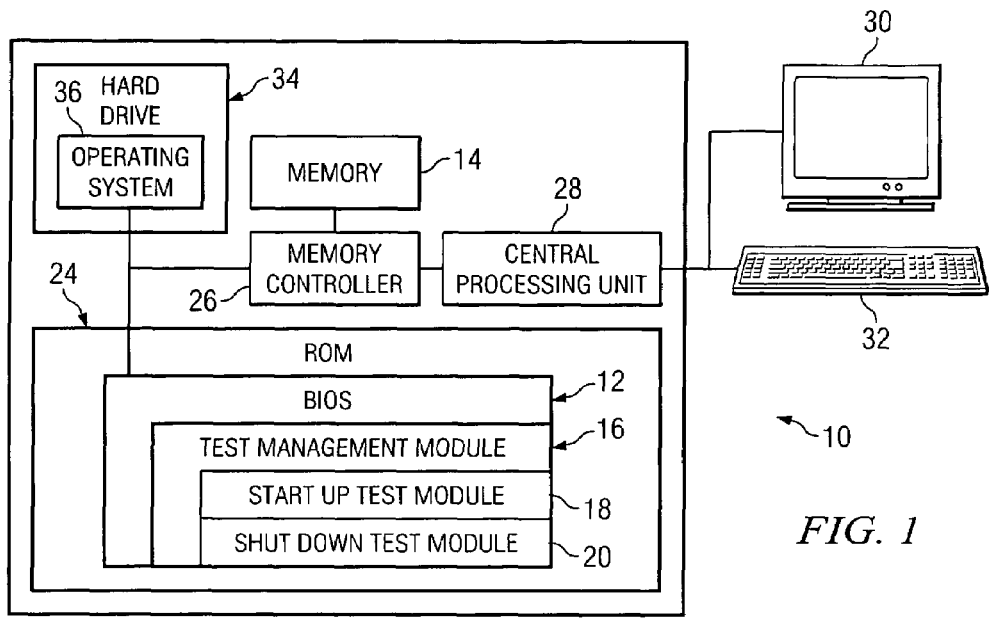
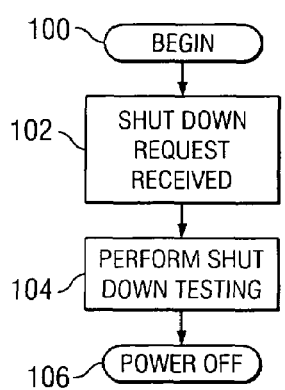
*FIG. 1*
*FIG. 2*

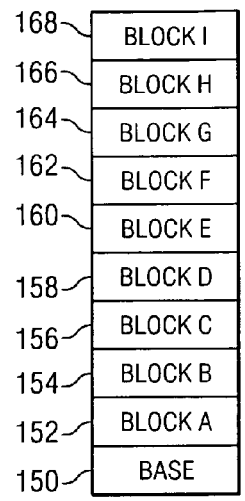
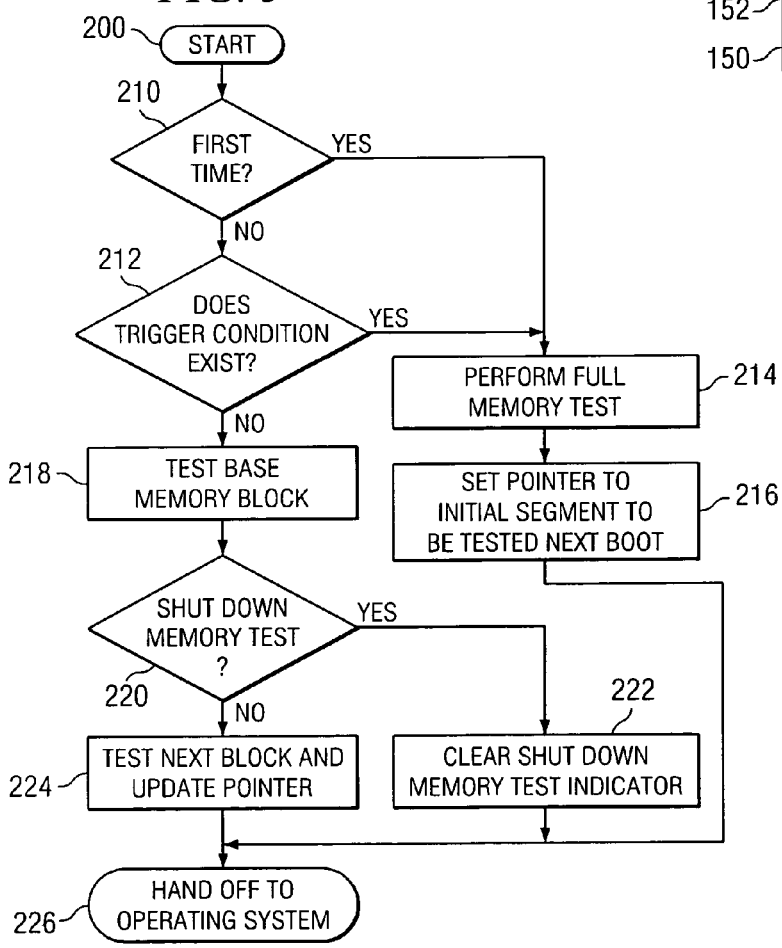

SYSTEM AND METHOD FOR SHUTDOWN MEMORY TESTING

TECHNICAL FIELD

This invention relates in general to information systems and more particularly to a system for testing memory at system shutdown.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Memory is a key feature of an information handling system. As the functionality of information handling systems has expanded, the amount of memory required and utilized by information handling systems has also increased. More memory allows users to run larger programs and store larger amounts of information.

During the initialization of the information handling system, a basic input/output system (BIOS) executes a power-on self-test (POST) routine that tests the memory's stability and integrity. After the POST routine is completed, the operating system is loaded and the system is ready for use.

The amount of time it takes to test the memory in an information handling system is typically a linear function based on the size of the memory being tested. As the amount of system memory increases, the amount of time for memory testing increases proportionally. Current memory testing tests all of the system's random access memory during each boot operation.

Memory testing with conventional methods has the disadvantage of taking too much time, leading to long boot times. As the amount of memory increases, the duration of boot operations increases. Because users desire short boot times and find long boot times to be inconvenient, this delay can be unacceptably long to users and can reflect negatively on the information handling system as a whole. Also, software developers desire minimal boot times and provide incentives to information handling system manufacturers that produce favorable boot times.

SUMMARY

Therefore, a need has arisen for a system and method for decreasing the time to complete a boot operation in an information handling system.

A further need exists for a system and method for managing system memory testing to minimize user inconvenience.

In accordance with the teachings of the present disclosure, a system and method for reducing the amount of time for a boot operation is provided that substantially reduces disadvantages and problems associated with previously developed memory testing systems and methods. The system includes using a shutdown memory test module to perform the bulk of memory testing during system shutdown, rather than at system start up.

In one aspect, an information handling system is disclosed that includes a BIOS and a memory. The BIOS includes a test management module and is connected with the memory and is able to perform memory testing thereon. The test management module has a startup test module that can selectively test the system memory during startup. The test management module also has a shutdown test module that can selectively test the memory during shutdown of the system.

In another aspect of the present disclosure, a test management module is disclosed. The test management module includes a startup test module that can selectively test an associated system memory during system startup. The test management module also includes a shutdown test module that is able to selectively test the associated system memory during shutdown of the associated system.

In yet another aspect, a method for performing memory testing in an information handling system is disclosed. The method includes receiving a system shutdown request, and then testing an associated system memory prior to system shutdown. The method then includes indicating that memory testing has been performed during a most recent system shutdown and testing the associated system memory during startup of the system only if memory testing was not performed during the most recent system shutdown.

The present invention provides a number of important technical advantages. One technical advantage is performing memory testing during system shutdown. This allows a system's memory testing to be shifted away from system boot up. This has the added benefit of minimizing user delay by decreasing the time to boot up a system. Further advantages of the present disclosure are described in the description, FIGURES, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a diagram of an information handling system including a test management module according to teachings of the present disclosure;

FIG. 2 is a flow diagram of a shutdown testing method;

FIG. 4 is a diagram of a system memory divided into a basic memory block and a series of test memory blocks;

FIG. 5 is a flow diagram showing a method for performing memory testing during system shutdown according to teachings of the present disclosure.

DETAILED DESCRIPTION

Figure 3A:
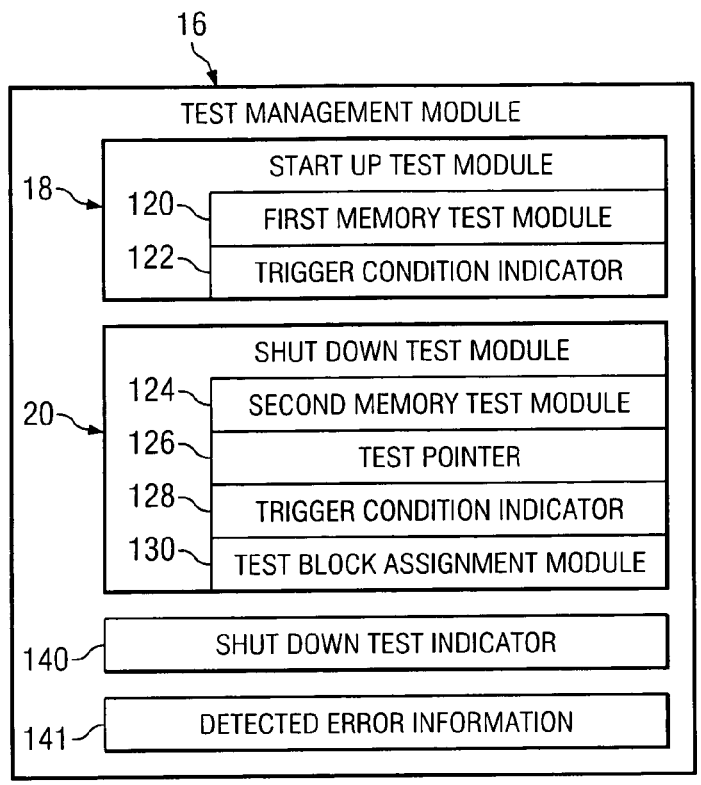
FIG. 3A is a diagram of a test management module according to teachings of the present disclosure.

Preferred embodiments and their advantages are best understood by reference to FIGS. 1 through 5, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various components.

Now referring to FIG. 1, an illustration of information handling system 10 is shown. Information handling system 10 includes BIOS 12 and memory 14. BIOS 12 is the basic input/output system of information handling system 10. BIOS 12 serves as an intermediary between the operating software (such as operating system 36) and hardware (such as memory 14). In the present embodiment, BIOS 12 is contained in read only memory (ROM) chip 24. When information handling system 10 is turned on, BIOS 12 runs a Power On Self Test (POST) routine, as is well known to those of skill in the art. After completion of the POST routine, BIOS 12 preferably hands off to operating system 36. During the POST routine, BIOS may perform data testing and address testing on memory 14, as discussed below.

Memory 14 provides data storage for information handling system 10. In the present preferred embodiment memory 14 is random access memory (RAM). Memory 14 may also encompass dynamic random access memory (DRAM), extended Data Out random access memory (EDO RAM), video random access memory (VRAM), Static random access memory (SRAM), synchronous DRAM (SDRAM), single in-line memory modules (SIMM), dual in-line memory modules (DIMM), error correcting code (ECC) or any other suitable data storage medium. Memory 14 may encompass a single component (such as a single microchip) or multiple memory components.

In the example embodiment, information handling system 10 may further include respective software components and hardware components, such as read only memory (ROM) chip 24, memory manager/controller 26, central processing unit (CPU) 28, display 30, keyboard 32, hard drive 34, and operating system 36. Information handling system 10 may further include expansion cards, memory chips, processors, as well as any other appropriate hardware components.

BIOS 12 contains test management module 16. Test management module 16 includes start up test module 18 and shutdown test module 20. Start up test module 18 and shutdown test module 20 function to test memory 14. In the present preferred embodiment, start up test module 18 and shutdown test module 20 may selectively perform both data testing and address testing on memory 14. Test modules 18 and 20 perform data testing on memory 14 by writing a series of data points on memory 14. Test modules 18 and 20 then read back the data, comparing the data pattern written to the data pattern read. If the data patterns are the same, then the memory is determined to be functioning correctly.

Test modules 18 and 20 perform address testing by sending a message to a particular memory address. Test modules 18 and 20 then read the data from the address where the data was sent. If the correct data pattern is found at the correct location, the memory's address is determined to be functioning properly. In alternative embodiments, test module 18 and 20 may perform alternative or additional memory testing. In other alternate embodiments, test modules 18 and 20 may direct data testing and/or address testing from a common test module.

Now referring to FIG. 2, a flow diagram of a shutdown testing method is shown. The method begins at 100 when a system shutdown request is received 102. The shutdown request is typically initiated by a user of system 10 who wishes to shutdown the system. After the shutdown request is received, shutdown testing of the system's memory (such as memory 14) is performed. As used herein, shutdown testing generally refers to any memory testing performed after system shutdown has been initiated and prior to the actual shutdown of the system. In a preferred embodiment, shutdown testing is performed by shutdown test module 20 and includes data testing and address testing. After memory testing is complete, the system completes the remaining shutdown operations and powers off the system 106.

Now referring to FIG. 3A, a diagram of test management module 16 is shown. Test management module 16 includes start up test module 18, shutdown test module 20, and shutdown test indicator 140. In the present embodiment, start up test module 18 includes first memory test module 120 and trigger condition indicator 122. Also in the present embodiment, shutdown test module 20 includes second memory test module 124, test pointer 126, trigger condition indicator 128, and test block assignment module 130.

In the present embodiment, first memory test module 120 performs the actual data testing or address testing for start up test module 18. Start up test module 18 acts to selectively initiate first memory test module 120 to perform memory testing during start up operations of system 10.

Trigger condition indicator 122 acts to show whether a trigger condition exists. A trigger condition, generally includes any event or action associated with system 10 or memory 14 that may be reasonably anticipated to effect memory 14 and thus warrant testing thereof. For instance, the detection of the following events may constitute a trigger condition: a chassis intrusion (of a chassis associated with system 10), a change in the serial number of memory 14, a change in the total amount of memory 14, a thermal incident. Additionally, a lapse of a given period and a lapse of a selected number of consecutive cold boots or shutdowns without a complete memory test may constitute a trigger event.

First start up test module 18 is operable to communicate with shutdown test indicator 140. Shutdown test indicator 140 shows whether memory testing was performed on memory 14 during the most recent shutdown of system 10. During boot up operations, startup test module 18 queries trigger condition indicator 122 and shutdown test indicator 140. If trigger condition indicator 122 shows that a trigger condition exists, first memory test module 120 then performs memory testing on memory 14 during boot operations.

In the event that trigger condition indicator 122 does not show that a trigger condition exists, first memory test module 120 then queries shutdown test indicator 140 to determine whether shutdown testing was performed during the most recent shutdown operation. If the shutdown test monitor 140 shows that testing was performed during the most recent shutdown, startup test module then proceeds with normal boot operations without performing a full test of memory 14. In some embodiments, startup test module 18 may perform limited memory testing (such as data testing and address testing as discussed above) on a portion of memory 14 such as base block 150 shown in FIG. 4. One advantage of the present disclosure is that if startup test module 18 does not detect a need to perform memory testing (because, for instance, no trigger condition exists and memory testing was performed during the most recent shutdown operation) startup test module 18 will either perform no testing of memory 18 or will perform only minimal testing of memory 14.

In the instances that startup test module 18 does determine a need to perform memory testing of memory 14, after such memory testing is performed, startup test module 18 then resets trigger condition indicator 122 and 140, as appropriate. In the present embodiment, startup test module 18 may also reset trigger condition indicator 128 associated with shutdown test module 20 as described below. After completion of memory testing (or determining that no memory testing is required), startup test module 18 then proceeds with subsequent boot.

Shutdown test module 16 operates after a user has initiated the shutdown of system 10. After system shutdown has been initiated, second memory test module 124 acts to test memory 14 prior to system shutdown. Second memory test module 124 performs data testing and address testing on memory 14.

After completion of testing of memory 14, shutdown test module 20 communicates with shutdown test indicator 140 to show that shutdown memory has been completed.

In the event that an error or problem is detected a number of different actions may be taken on response. For instance, the detected error or failure may be detected player to the user on, for example, a front panel LCD. The detected error may also be logged into the System Error Log (not expressly shown). An appropriate message may be displayed to the user on display device 30, an error indicator may be saved within deleted error information 141 and displayed to the user during the next start up.

In the present embodiment, shutdown test module 20 also includes test pointer 126 and test block assignment module 130.

Test block assignment module 130 divides memory 14 into a base memory block 150 and plurality of test memory blocks (for example, blocks A-Z as shown in FIG. 4). Base memory block 150 is preferably the first portion of memory 14 and has a preselected size. In some embodiments, base memory block 150 may store all or a portion of the operating system of system 10.

Test block pointer 126 records the most recently tested memory test block and indicates the next test block to be testing. For example, if during the last system shutdown, memory block C 156 was tested, then test pointer 126 records that test memory block C 156 was tested and will indicate that test memory block D 158 will be tested during the present shutdown operation. If block I 168 was the last block tested, then test pointer 126 indicate that test memory block I 168 was the last block tested and that test block A 152 should be tested during the next shutdown operation. Test block pointer 126 operates by communicating with second memory test module 124. Second memory test module 124 tests base block 150 and the selected test memory block. Then second memory test module 124 communicating the last selected test memory block tested to test pointer 126. This memory testing approach incorporates many of elements of the memory testing method described in U.S. patent application Ser. No. 10/385,228 entitled "System and Method for Testing Memory" filed Mar. 10, 2003 and incorporated by reference.

Trigger condition indicator 128 determines if a trigger condition exists(as described above with respect to first trigger condition indicator 122). If a trigger condition exists, second memory test module 124 proceeds to test base memory block 150 and all test memory blocks A-I (152-168). If no trigger condition exists, second memory test module 124 tests base memory block 150 and the next sequential test memory block indicated by test pointer 126. In this manner, during multiple shutdown operations where no trigger condition exists, test management module 16 will eventually test all memory blocks A-I (152-168).

In an alternate embodiment, test pointer 126 identifies the last-tested memory block. During a shutdown operation, second memory test module 124 reads the last-tested memory block from memory test block pointer 126 and then determines the next sequential test block for testing. Second memory test module 124 then preferably resets test pointer 126 to indicate the most recently tested block of memory.

In another embodiment, if a trigger condition exists, second memory test module 124 tests base memory block 150 and all memory test blocks A-I (152-168). Second memory test management module 124 may then select the memory test block that will be tested during the next system shutdown. After the completion of a test of base block 150 and all of the additional test blocks 152-168, as described above, second memory test module 124 may select the first sequential test block A 152 to be tested during the next shutdown operation.

Figure 3B:
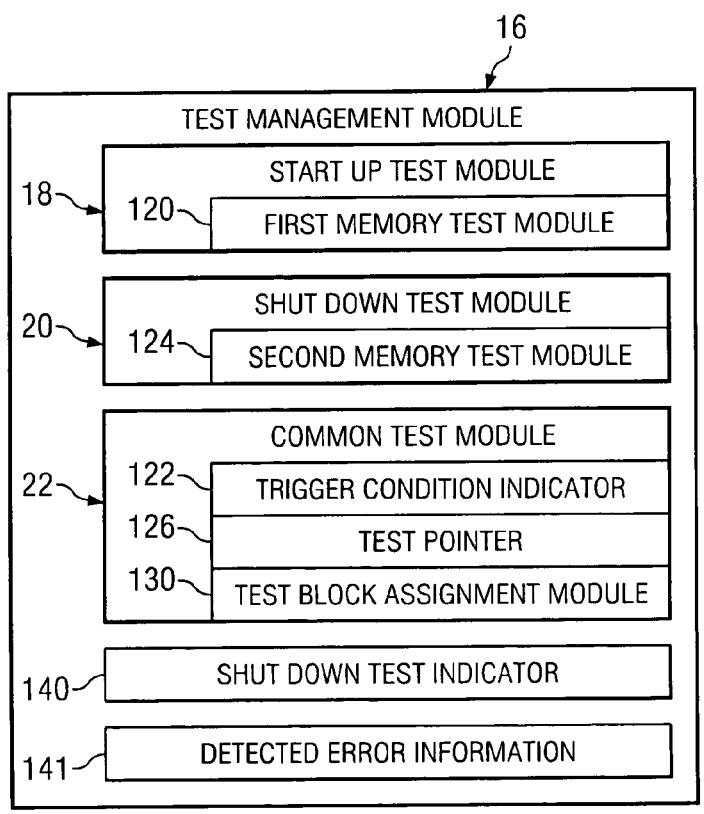
FIG. 3B is a diagram of a test management module according to teachings of the present disclosure.

FIG. 3B shows test management module 16 having a slightly altered structure in this embodiment, test management module 16 involves start up test module 18 and shut down test module 20 along with shut down test indicator 140 and detected error information 141 as described above. Test management module 16 also includes common test module 22 that includes trigger condition indicator 122, test pointer 126, and test block assignment module 130. Common test module 22 is preferably accessible to both start up such that both modules may utilize trigger condition indicator 122, test pointer 126, and test block assignment module 130 to perform the functions described above.

FIG. 4 is a diagram of memory 14 associated with information handling system 10. In the present embodiment, test block assignment module 130 of shutdown test module 20 divides memory 14 into a base memory block 150 and a plurality of test memory blocks A-I 152-168. In the present preferred embodiment, test block assignment module 16 first determines the total amount of system memory 14. Based on the amount of total memory 14, test block assignment module 130 may divide memory 14 into multiple memory test blocks. In one embodiment, test management module 16 determines the total amount of memory 14. Test block assignment module 130 then designates the size of base memory block 150 as a selected first fraction of total memory. Test block assignment module 130 then designates the size of each memory test block as a second selected fraction of total memory.

In the present embodiment, base memory 150 is approximately one-tenth of the total memory 14. After designating base memory 150, test block assignment module 18 then divides the remaining memory 14 into test memory blocks A-I (152-168) where test memory blocks A-I (152-168) are each approximately one-tenth of memory 14. Test block assignment module 18 also preferably assigns the test memory blocks A-I (152-168) sequentially.

In another embodiment, the base memory block 150 may be one-sixteenth of total memory 14 and test block assignment module 130 preferably divides memory 14 into sixteen blocks. In this embodiment, base memory block 150 and the fifteen additional blocks may be labeled as, for example, test memory blocks A-O. In other alternative embodiments, memory blocks may be any suitable fraction of total memory 14.

In yet another embodiment, test block assignment module 130 may divide memory 14 into memory blocks based on a set memory size. For example, it may divide memory 14 into set blocks of 256 megabytes (MB) or another selected size regardless of the size of memory 14.

In another embodiment, test block assignment module 18 may divide memory 14 into blocks based upon the processing speed of information handling system 10.

In still other alternate embodiments, base memory block 150 may have a selected size (such as 640 KB, 1 MB, 2 MB, etc.) while memory blocks A-I have a different selected size.

Now referring to FIG. 5, a schematic flow diagram showing a memory testing method is shown. The method begins 200 and startup test module 18 associated with BIOS 12 determines whether this is the first time the system has been powered on 210.

If it is the first boot operation, startup test module 18 proceeds to step 214, to test memory 14. If it is not the first time that the system is powered on, the method then proceeds to determine whether a trigger condition exists 212.

If a startup test module 18 determines either that it is the system's first boot 210 or that a trigger condition exists 212, startup test module 18 proceeds with performing a full memory test 214. In the present embodiment, after completing the full memory test 214, a test pointer (such as test pointer 126 associated shutdown test module 20 shown in FIG. 3) is reset to indicate the portion of memory 14 to be testing during the next shutdown testing. For instance, the pointer may be reset such that to point will indicate that the first sequential memory block (such as memory block A152 of FIG. 4 should be the next memory block tested during the next shutdown memory test. Alternatively, the pointer may be set indicate the next consecutive memory block. For instance, if the pointer is set to memory block E prior to testing, following testing, the pointer may be updated to indicate memory block F. In yet another alternate embodiment, pointer may remain unchanged following a full memory test 214.

After performing the memory test 214 and updating the pointer 216, the startup test module then proceeds to hand off to the operating systems.

In the event that it is not the first boot of the system and that no trigger conditions exist 212, the startup test module 218 tests base memory block 218. After completing the test of the base memory 218, startup test module 18 queries shutdown test indicator 140 to determine whether memory 14 was testing during the most recent shutdown operation. If the shutdown test indicator shows that memory testing was completed during the most recent memory testing, the shutdown test indicator is reset 140 and the startup test module then hands off to the system's operating system.

If the startup test module determines that the memory has not tested during the most recent shutdown, the startup module performs additional memory testing 224 prior to handing off to the operating system. In the present embodiment, startup test module tests the next memory block to be tested 224 (as indicated by pointer 126). Pointe 126 is then updated and startup test module hands off to the operating system 226.

Although the disclosed embodiments have been described in detail, it should be understood that various changes, substitutions and alterations can be made to the embodiments without departing from their spirit and scope.

What is claimed is:

1. An information handling system comprising:
   a BIOS having a test management module;
   a memory;
   the BIOS in communication with the memory and operable to test the memory;
   the test management module having:
      a shutdown test module operable to selectively test the memory during shutdown of the systems;
      a shutdown test indicator for recording whether a shutdown memory test was performed during a particular system shutdown; and
      a startup test module operable to:
         communicate with the shutdown test indicator during a startup operation subsequent to the particular system shutdown to determine whether a shutdown memory test was performed during the particular system shutdown; and
         determine whether to test the memory during the startup operation based at least on whether a shutdown memory test was performed during the particular system shutdown.

2. The information handling system of claim 1 further comprising:
   the startup test module operable to test the memory if a shutdown test was not performed during the particular system shutdown; and
   the startup test module operable to not test the memory if a shutdown test was performed during the particular system shutdown.

3. The information handling system of claim 1 wherein the startup test module further comprises a trigger condition indicator, the startup test module operable test the memory if a trigger condition exists.

4. The information handling system of claim 3 further comprising the trigger condition selected from the group consisting of:
   a chassis intrusion, a change in memory serial number, a change in total memory, a selected thermal incident, and a lapse of a selected period.

5. The information handling system of claim 1 wherein the memory comprises system RAM.

6. The information handling system of claim 1 further comprising the startup test module and the shutdown test module operable to perform data testing and address testing on the memory.

7. The information handling system of claim 1 wherein:
   the shutdown test module further comprises a memory test module operable to perform data testing and address testing on the memory during the particular system shutdown; and the shutdown test module operable to update the shutdown test indicator after completing the memory test.

8. The information handling system of claim 7 wherein:
the shutdown test module further comprises a test block assignment module operable to divide the memory into a base memory block and a plurality of memory test blocks;
the shutdown test module further comprises a test pointer; and
the shutdown test module operable to test the base memory block and at least one selected memory test block during each system shutdown.

9. The information handling system of claim 8 further comprising the shutdown test module operable to update the test pointer to indicate the last memory test block tested during the most recent shutdown.

10. The information handling system of claim 7 wherein the shutdown test module further comprises a trigger condition indicator, the shutdown test module operable to perform a complete test of the memory when a trigger condition is indicated by the trigger condition indicator.

11. The information handling system of claim 7 further comprising the test management module operable to reset the shutdown test indicator after completing a system startup.

12. A test management module comprising:
a shutdown test module operable to selectively test an associated system memory during a particular shutdown of the associated system; and
a startup test module operable to:
determine, during a startup operation subsequent to the particular system shutdown, whether a shutdown memory test was performed during the particular system shutdown; and
determine whether to test the memory during the startup operation subsequent to the particular system shutdown based at least on whether a shutdown memory test was performed during the particular system shutdown.

13. The test management module of claim 12 further comprising:
a shutdown test indicator for recording whether a shutdown memory test was performed during the particular system shutdown; and
the startup test module operable to test the memory during the startup operation subsequent to the particular system shutdown if a shutdown memory test was not performed during the particular system shutdown.

14. The test management module of claim 12 wherein:
the shutdown test module further comprises a memory test module operable to perform data testing and address testing the associated memory; and
the shutdown test module operable to update an associated shutdown test indicator after completing a memory test.

15. The test management module of claim 14 wherein:
the shutdown test module further comprises a test block assignment module operable to divide the memory into a base memory block and a plurality of memory test blocks;
the shutdown test module further comprises a test pointer; and
the shutdown test operable to test the base memory block and at least one selected memory test block during each system shutdown.

16. The test management module of claim 15 further comprising the shutdown test module operable to update the test pointer to indicate the last memory test block tested during the most recent shutdown.

17. A method for performing memory testing in an information handling system comprising:
receiving a system shutdown request for testing an associated system memory prior to a particular system shutdown;
during a subsequent startup of the system, determining whether the system memory was tested during the particular system shutdown;
testing the associated system memory during the subsequent startup of the system if the system memory was not tested during the particular system shutdown; and
not testing the associated system memory during the subsequent startup of the system if the system memory was tested during the particular system shutdown.

18. The method of claim 17 further comprising testing the associated system memory during startup of the system if a trigger condition exists, the trigger condition selected from the group consisting of: a chassis intrusion, a change in memory serial number, a change total memory, and a detected thermal incident.

19. The method of claim 17 further comprising updating a shutdown test indicator to show whether a shutdown memory test was performed during the particular system shutdown.

* * * * *